United States Patent [19]

Dudash

[11] Patent Number: 4,545,407
[45] Date of Patent: Oct. 8, 1985

[54] JAM COMPENSATING CONTROL VALVE

[75] Inventor: Carl S. Dudash, Enfield, Conn.

[73] Assignee: United Technologies Corporation, Hartford, Conn.

[21] Appl. No.: 584,676

[22] Filed: Feb. 29, 1984

[51] Int. Cl.[4] .................. F15B 13/04; F15B 20/00
[52] U.S. Cl. ............................. 137/596; 91/466; 137/625.69
[58] Field of Search ............. 137/596, 625.69; 91/466

[56] References Cited

U.S. PATENT DOCUMENTS

| | | |
|---|---|---|
| 2,597,418 | 5/1952 | Westbury et al. . |
| 2,597,419 | 5/1952 | Westbury et al. . |
| 2,675,679 | 4/1954 | Parker . |
| 2,956,408 | 10/1960 | Fowler . |
| 3,190,185 | 6/1965 | Rasmussen ............. 91/363 |
| 3,253,613 | 5/1966 | Richolt ..................... 137/596 |
| 3,295,420 | 1/1967 | Gleason ................... 91/216 |
| 3,426,650 | 2/1969 | Jenney ..................... 91/216 |
| 3,439,707 | 4/1969 | York et al. .............. 137/596 |
| 3,494,256 | 2/1970 | Bioletti et al. ......... 91/170 |
| 3,527,143 | 9/1970 | Hayter . |
| 3,529,514 | 9/1970 | Mayo . |
| 3,581,772 | 6/1971 | Wills ...................... 137/625.69 |
| 3,640,185 | 2/1972 | Korsak . |
| 3,683,749 | 8/1972 | Bayles ..................... 91/438 |
| 3,768,376 | 10/1973 | Orme ................... 137/625.69 X |
| 3,911,942 | 10/1975 | Becker ..................... 137/117 |
| 3,928,968 | 12/1975 | Becker et al. .......... 60/403 |
| 3,933,176 | 1/1976 | Wheeler .................. 137/596 |
| 4,090,429 | 5/1978 | Kamimura ............ 137/596 X |
| 4,167,135 | 11/1979 | Lindsey .................. 92/61 |

*Primary Examiner*—Gerald A. Michalsky
*Attorney, Agent, or Firm*—John Swiatocha

[57] ABSTRACT

An improved jam compensating control valve (45) includes a spool (65) which blocks and unblocks a flow passage through the valve. The spool is slidably disposed within an inner sleeve (60) which, upon jammed interengagement with the spool moves therewith, thereby connecting drain passsages (180, 182, 185, 190 and 195) in the surface of the spool with outlet passages (120 and 125) communicating with an associated actuator (5) for actuator draining in response to such valve jamming.

6 Claims, 3 Drawing Figures

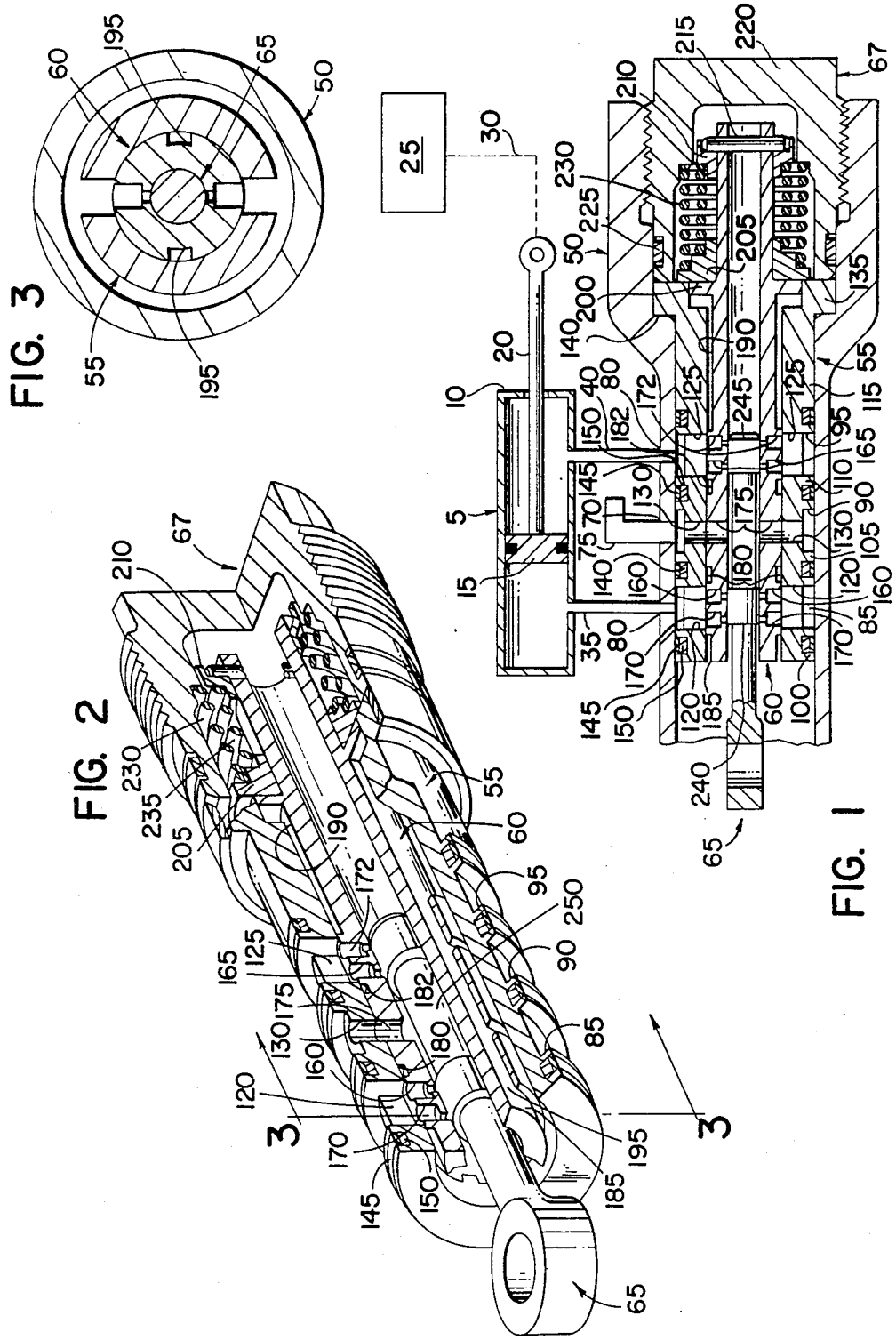

JAM COMPENSATING CONTROL VALVE

DESCRIPTION

TECHNICAL FIELD

This invention relates to valves, and particularly to valves for controlling hydraulic actuators.

BACKGROUND ART

Hydraulic actuators such as those used to position actuated devices such as control surfaces in aircraft are frequently employed in pairs, each actuator of the pair being capable of independently positioning the device, whereby control thereof by one of the actuators may be preserved despite failure of the other. Those skilled in the art will appreciate that hydraulic actuators such as double-acting piston-cylinder actuators must be capable of positioning the actuated device while at the same time moving the connected piston of an inoperative redundant actuator, such inoperability being due, for example, to a failure of a control valve associated with the inoperative actuator. It has been the practice in the prior art to provide such control valves with means for draining an associated actuator in the event of failure of the control valve such as by the jamming thereof so that the operative actuator is not required to overcome the pressurization of the inoperative actuator in moving the piston thereof while positioning the actuated device. Such prior art control valve mechanisms for draining an hydraulic actuator in the event of a jamming of the control valve have heretofore generally involved rather complex configurations of internal fluid passages and ports. Such internal passage and port configurations have proven to be difficult, time consuming and costly to machine into the valve's internal structure and require substantial valve length for their accomodation. In aircraft applications where compactness is often paramount, such length may not be tolerable. Furthermore, such internal prior art drain passages and porting contribute to the complexity of the valve and thus, may in some cases adversely affect the reliability of the valve.

DISCLOSURE OF INVENTION

It is therefore a principal object of the present invention to provide an improved jam compensating control valve which overcomes the deficiencies of the prior art.

It is another object of the present invention to provide such a control valve with an uncomplicated network of fluid passages and ports for the reliable draining of an associated actuator in the event of a malfunction in the control valve.

It is a further object of the present invention to provide such a control valve characterized by a simplicity of structure and economy of manufacture.

In accordance with one aspect of the present invention, a control valve for use with an hydraulic actuator is provided with a network of passages for draining the actuator in the event of a malfunction in the valve, such passages being in the outer surface of one of the valve's components for enhanced economy, simplicity of structure and reliability. More specifically, the control valve includes an inner sleeve having radial inlet and outlet passages therein for normal communication with corresponding inlet and outlet passages in a housing. Control of hydraulic fluid flow through these passages is achieved by a simple valve spool slidably received within the sleeve. The sleeve is maintained in normal alignment with the housing by a pair of concentric springs retained within one end of the valve. The outer surface of the sleeve is provided with the drain passage network noted hereinabove which comprises an uncomplicated arrangement of circumferential drain grooves disposed on opposite sides of the outlet passages and intersected by a longitudinal drain slot angularly offset with respect to the outlet passages. Jamming of the spool and the sleeve effects joint axial movement of the sleeve and spool thereby placing the circumferential drain grooves (and therefore, the longitudinal slot) in communication with the radial outlet passages of the housing to drain the associated actuator. Compactness of the valve is enhanced by the concentric arrangement of the springs and an outer sleeve configuration employing circumferential seal rings for sealing the outer sleeve to the housing.

BRIEF DESCRIPTION OF DRAWINGS

FIG. 1 is a side elevation of the control valve of the present invention and a schematic illustration of an associated hydraulic actuator and an actuated device positioned thereby;

FIG. 2 is an isometric view of the control valve of the present invention, portions thereof being broken away to show details of construction; and FIG. 3 is a sectional view of the control valve of the present invention taken in the direction of line 3—3 of FIG. 2.

BEST MODE FOR CARRYING OUT THE INVENTION AND INDUSTRIAL APPLICABILITY THEREOF

Referring to the drawing, and specifically FIG. 1 thereof, there is shown a double-acting hydraulic actuator 5 comprising a cylinder 10 and a piston 15 capable of reciprocal, rectilinear movement within the cylinder in response to pressurization thereof with a suitable hydraulic fluid. Piston 15 has a longitudinal rod 20 connected thereto which at the end thereof is connected to an actuated device 25 by any suitable means such as linkage 30. Actuated device 25 may, for purposes of illustration, be assumed to be an aircraft control surface or the like. Cylinder 10 is pressurized and drained at opposite ends thereof (opposite sides of piston 15) through lines 35 and 40 connected to control valve 45 of the present invention. In operation, when actuation of device 25 by movement of piston 15 to the right is desired, hydraulic fluid is admitted to the actuator through line 35 by an appropriate setting of valve 45, thereby pressurizing the left side of the cylinder while fluid in the right side of the cylinder is drained through line 40. Likewise, actuation of device 25 by movement of piston 15 to the left is achieved by pressurization of the right side of cylinder 10 through line 40 and draining of the left side of cylinder 10 through line 35 by an appropriate adjustment of valve 45.

Valve 45 comprises housing 50, concentric sleeves 55 and sleeve 60 disposed within the interior of housing 50, and a movable valve spool 65 disposed within the interior of sleeve 60 and reciprocally slidable therewithin under normal operating conditions.

Housing 50 is shown here as being generally cylindrical with an enlarged interiorly threaded end portion 67. The housing is provided with an inlet port 70 through which hydraulic fluid is admitted into the valve from a suitable source (not shown) through line 75, and a pair of outlet ports 80 which connect with lines 35 and 40.

Outer sleeve 55 comprises a generally cylindrical member having circumferential grooves 85, 90 and 95 therein, the grooves defining spaced lands 100, 105, 110 and 115. Grooves 85 and 95 are radially bored at 120 to provide first outlet passages which, with grooves 85 and 95, are axially aligned with ports 80 in outer housing portion 50. Groove 90 is radially bored at 130, these bores comprising first inlet passages in alignment with inlet ports 70. Outer sleeve 55 also includes a radially outwardly extending flange 135 at the right-hand end thereof, this flange including a shoulder portion 140 which seats against a mating aligned surface in the interior of outer housing portion 50. Each of lands 100, 105, 110 and 115 is provided with a circumferential groove in the surface thereof each groove accommodating a seal ring 145 and, if desired, an expansion ring 150, seal ring 145 minimizing the leakage across the radially outer surfaces of the lands.

Inner sleeve 60 is received within outer sleeve 55 and is radially drilled and counterbored to provide inlet passages 160 and 165 and drain passages 170 and 172 and radially drilled to provide outlet passages 175. Circumferential grooves 180 and 182 are provided in the outer surface of sleeve 60 and juxtaposed with respect to inlet passages 160 and 165. Further, circumferential drain grooves are provided by reduced diameter (necked down) portions 185 and 190 spaced slightly from inlet passages 160 and 165. The circumferential drain grooves and reduced diameter portions are all intersected by longitudinally extending drain slots 195 (FIG. 3) extending the entire length of the sleeve. Sleeve 60 is also provided with a radially outwardly extending flange 200 slidably received within a mating counterbored portion of sleeve 55. Sleeve 60, at the right end portion thereof, carries a pair of spaced spring retainers 205 and 210 thereon, retainer 205 being free to slide along the surface of the sleeve in a right-hand direction, but being restrained in a left-hand direction by flange 200 and a radially inner portion of flange 135 of housing portion 55. Spring retainer 210 is fixed to sleeve 60 as by pin 215 or any similar fastener.

The right end of valve 45 is enclosed by an end cap 220 threaded into the enlarged end of housing portion 55 and is sealed thereto by seal ring 225 received within a circumferential groove in the inner surface of cap 220 at the left end thereof. As shown, the left end of valve 45 is open to drain, the left end of housing 50 defining a drain port. However, it will be understood that this end may be closed in any various known ways such as by a threaded cap of the type described hereinabove, in which case a discrete drain port would be provided.

Sleeve 60 is maintained in axial alignment with sleeve 55 by a pair of concentric springs 230 and 235. Outer spring 230 is interposed between spring retainer 205 and an interior shoulder of threaded end cap 220 and biases sleeve 60 against movement thereof to the right by compression of the spring due to movement of retainer 205 with the sleeve. Inner spring 235 is retained between retainers 205 and 210 and biases sleeve 60 against movement to the left due to spring compression by the movement of spring retainer 210 with the sleeve.

Spool 65 comprises spaced cylindrical lands 240 and 245 connected by a reduced diameter portion 250. As illustrated, in a nulled position, the lands seal passages 160, 165, 170 and 172 in the sleeve and as described hereinbelow, selectively open and close a flow passage between inlet passages 175 and outlet passages 160 and 165.

Operation of valve 45 is as follows. In the position shown, the valve is nulled, blocking flow of hydraulic fluid both toward and away from actuator 10 hereby holding the position of piston rod 20 and therefore actuated device 25 to that shown. Should it be desired to reposition actuated device 25 in a manner corresponding to rightward movement of rod 20, valve spool 65 is moved to the left, opening a flow conduit from inlet passage 175 to outlet passages 160 by way of the outside of the valve spool between lands 240 and 245. This further pressurizes the left end of cylinder 10 through passage 120, outlet port 80 and line 35, the increased pressure forcing piston 15 to the right. As the piston moves to the right, it forces fluid out of cylinder 10, through line 40, passage 125 and passage 172 in sleeve 55 which is uncovered by the leftward movement of the spool. When the desired position of piston 15 is reached, the spool is once again moved to the position shown to completely block passages 160, 165, 170 and 172. Similarly, movement of piston 15 to the left is achieved by movement of spool 65 to the right thereby pressurizing the right-hand end of cylinder 12 through passages 130, 175, 165 and 125 and line 40 while the left end of the actuator is drained through line 35, and passages 120 and 170.

Should sleeve 60 jam with spool 65 as by interposition of foreign matter therebetween, movement of spool 65 will eventually overcome the biasing forces of springs 230 and 235 to move sleeve 60 longitudinally with the spool. Such longitudinal movement of sleeve 60 will align circumferential drain grooves 180 and 182 and reduced diameter portions 185 and 190 with outlet passages 120 and 125 in housing portion 55 thereby connecting the actuator to drain. More specifically, movement of the spool and sleeve 60 to the right will align right-hand groove 182 and passage 125 as well as reduced portion 185 and passage 120, whereby the actuator 5 will drain through both lines 35 and 40, outlet passages 120 and 125 and the drain grooves to axial drain slots 195 and out the left end of the valve. In like manner, movement of the inner sleeve and spool to the left aligns reduced diameter portion 190 of the sleeve and groove 180 with outlet passages 125 and 120, respectively, for similar draining of both actuator ends.

It will be seen from the description herein, that the provision of the circumferential drain grooves and axial drain slot assures effective draining of the actuator in response to any jammed interengagement of spool 65 with sleeve 60, yet such draining is achieved entirely with surface passages. Accordingly, the intricate internal drain passages associated with prior art control valve components are unnecessary whereby the valve of the present invention may be economically manufactured. The angular offset between the counterbored passages in sleeve 60 and the longitudinal drain slot obviate any interference between these fluid conduits. The arrangement of the concentric centering springs interiorly of end cap 220 allows inner sleeve 60 to be simply and compactly maintained in alignment with outer sleeve 60 while the seal rings in lands 100, 105, 110 and 115 compactly minimize leakage between the grooves in housing member 55.

While a particular embodiment of the present invention has been illustrated and described herein, it will be appreciated that such illustration and description will suggest to those skilled in the art, various alternatives for the practice of the present invention and it is intended by the appended claims to cover all such alternatives as fall within the true spirit and scope of this invention.

Having thus described the invention, what is claimed is:

1. A control valve adapted for controlling the pressurization of an hydraulic actuator, said control valve including an inlet port adapted for connection to a source of pressurized hydraulic fluid, outlet ports adapted for connection to the cylinder of the hydraulic actuator, a drain port for draining said actuator, and a movable valve spool for selectively opening and closing a flow passage between said inlet and outlet ports, said control valve being characterized by:

an outer sleeve including first radially oriented inlet and outlet passages therein;

an inner sleeve received within said outer sleeve and being normally stationary with respect thereto, said inner sleeve including second radially oriented inlet and outlet passages therethrough in normal alignment with said first inlet and outlet passages, said inner sleeve further including in the surface thereof, drain grooves adjacent said second outlet passages and a drain slot communicating with said drain port and intersecting said drain grooves;

said spool, in normal operation, being slidably disposed interiorly of said inner sleeve and including lands in selective registry with said second inlet and outlet passages, whereby slidable movement of said spool within said inner sleeve selectively opens and closes said second inlet and outlet passages to effect selective pressurization of said hydraulic actuator; and alignment means for maintaining said alignment of said first and second inlet and outlet ports in said inner and outer sleeves under normal operating conditions, and yielding to movement of said inner sleeve with respect to said outer sleeve under conditions of jamming between said inner sleeve and said spool, whereby joint, axial movement of said inner sleeve and said valve spool due to jamming therebetween, connects said drain grooves and therefore, said drain slot with said first outlet passages for depressurization of said actuator by draining thereof.

2. The control valve of claim 1 characterized by said drain grooves being circumferentially oriented with respect to said inner sleeve and in juxtaposition with said second outlet passage on opposite sides thereof.

3. The control valve of claim 1 characterized by said drain slot extending longitudinally with respect to said inner sleeve and being angularly offset from said second outlet passage.

4. The control valve of claim 1 characterized by a housing, said inlet and outlet ports and said drain port being disposed in said housing, said housing being provided with a cylindrical bore within which said inner sleeve, said outer sleeve, and said spool are received, said first inlet and outlet passages in said outer sleeve communicating with said inlet and outlet ports by way of circumferential grooves in the lateral surface of said outer sleeve, said grooves defining raised lands therebetween, said lands carrying seal rings in the outer surfaces thereof for sealing adjacent grooves in said outer sleeve from fluid communication therebetween.

5. The control valve of claim 1 characterized by adjacent ends of said inner sleeve, said outer sleeve and said spool being enclosed by an end cap, said end cap housing said alignment means, said alignment comprising a pair of springs for maintaining the normal alignment of said outer and inner sleeves, a first of said springs being retained between said inner sleeve and said cap for biasing said inner sleeve against longitudinal movement in one direction and a second of said springs being retained between said inner sleeve and said outer sleeve for biasing said sleeve against longitudinal movement in an opposite direction.

6. The control valve of claim 5 characterized by said springs comprising concentric coil springs, said first spring being disposed between an inner surface of said end cap and a first retainer carried by said inner sleeve, said first retainer being restrained in said opposite direction by said outer sleeve, said second spring being disposed between said first retainer and a second retainer fixed to said inner sleeve.

* * * * *